US011947634B2

(12) United States Patent
Wang et al.

(10) Patent No.: US 11,947,634 B2
(45) Date of Patent: Apr. 2, 2024

(54) IMAGE OBJECT CLASSIFICATION METHOD, SYSTEM AND COMPUTER READABLE MEDIUM

(71) Applicant: Footprintku Inc., Kaohsiung (TW)

(72) Inventors: Yan-Jhih Wang, Kaohsiung (TW); Kuan-Hsiang Tseng, Kaohsiung (TW); Jun-Qiang Wei, Kaohsiung (TW); Shih-Feng Huang, Kaohsiung (TW); Tzung-Pei Hong, Kaohsiung (TW); Yi-Ting Chen, Kaohsiung (TW)

(73) Assignee: Footprintku Inc., Kaohsiung (TW)

( * ) Notice: Subject to any disclaimer, the term of this patent is extended or adjusted under 35 U.S.C. 154(b) by 448 days.

(21) Appl. No.: 17/463,621

(22) Filed: Sep. 1, 2021

(65) Prior Publication Data

US 2023/0067231 A1  Mar. 2, 2023

(51) Int. Cl.
*G06F 18/2431* (2023.01)
*G06F 16/55* (2019.01)
*G06F 16/583* (2019.01)
*G06F 18/2413* (2023.01)

(52) U.S. Cl.
CPC .......... *G06F 18/2431* (2023.01); *G06F 16/55* (2019.01); *G06F 16/583* (2019.01); *G06F 18/2413* (2023.01)

(58) Field of Classification Search
CPC .... G06F 18/2431; G06F 16/55; G06F 16/583; G06F 18/2413; G06V 10/809; G06V 10/82; G06V 30/40–43
See application file for complete search history.

(56) References Cited

U.S. PATENT DOCUMENTS

| 10,936,916 B1 * | 3/2021 | Rahnama-Moghaddam ............... G06V 10/764 |
| 11,010,638 B2 * | 5/2021 | Gupta .................... G06F 18/214 |
| 11,170,290 B2 * | 11/2021 | Hoang ..................... G11C 11/34 |
| 11,443,193 B2 * | 9/2022 | Li ........................... G06V 10/25 |
| 2003/0063803 A1 * | 4/2003 | Lin .................... H04N 1/40062 382/165 |
| 2004/0076337 A1 * | 4/2004 | Nishida ................. G06V 30/162 382/167 |
| 2009/0190830 A1 * | 7/2009 | Hasegawa ............. G06V 30/413 358/1.15 |
| 2016/0149704 A1 * | 5/2016 | Al-Somani ............ H04L 9/3066 380/30 |
| 2019/0251425 A1 * | 8/2019 | Jaffari ................... G06V 10/764 |
| 2020/0394397 A1 * | 12/2020 | Li .......................... G06V 30/416 |
| 2021/0192262 A1 * | 6/2021 | Yamanaka .......... G06V 30/1444 |
| 2022/0237456 A1 * | 7/2022 | Belfiore ................ H03M 13/21 |

(Continued)

*Primary Examiner* — Aaron W Carter
(74) *Attorney, Agent, or Firm* — Rivka Friedman (57) ABSTRACT

An image object classification method and system are disclosed. The method is executed by a processor coupled to a memory. The method includes: providing an image file including at least one image object, performing a process of extracting multiple binary-classified characteristics on the image object to obtain a plurality of first results independent of each other in categories, combining the plurality of first results in a manner of dimensionality reduction based on concatenation, performing a process of characteristics abstraction on the combined first results to obtain a second result, and performing a process of characteristics integration on the plurality of first results and the second result in a manner of dot product of matrices to obtain a classification result.

10 Claims, 10 Drawing Sheets

(56) References Cited

U.S. PATENT DOCUMENTS

2022/0269898 A1* 8/2022 Kubo .................... G06V 10/20
2022/0392240 A1* 12/2022 Bianzino ............... G06T 1/0028
2023/0060459 A1* 3/2023 Wang .................... G06V 10/75
2023/0067231 A1* 3/2023 Wang .................. G06F 18/2431

* cited by examiner

IMAGE OBJECT CLASSIFICATION METHOD, SYSTEM AND COMPUTER READABLE MEDIUM

FIELD OF INVENTION

The present disclosure relates to a classification technology and, specifically, to an image object classification method and system.

BACKGROUND OF INVENTION

The development and applications of machine learning have gradually become an important field of research. A large amount of data (or information) can be used to train machine learning models, and the trained models can be used to obtain certain prediction information.

Object classification technology is widely used, such as being applied to image object classification. The conventional object classification model usually emphasizes that objects can be classified as a single category of information as an output result.

However, there are still shortcomings in classifying objects into a single category. Taking, as an example, a digital file containing multiple types of images, the actual application scenario needs to classify an object into multiple categories, but this is a factor that is usually not considered in conventional classification. Although there have been some classification techniques, they are still not suitable for certain applications.

In light of this, it is necessary to provide a technical solution different from the past to solve problems with the prior art.

SUMMARY OF INVENTION

One objective of the present disclosure is to provide an image object classification method that can classify image objects into multiple categories and is favorably suitable for digital files containing multiple image categories.

Another objective of the present disclosure is to provide an image object classification system that can classify image objects into multiple categories and is favorably suitable for digital files containing multiple image categories.

Another objective of the present disclosure is to provide a tangible, non-transitory, computer readable medium that can classify image objects into multiple categories and is favorably suitable for digital files containing multiple image categories.

To achieve the above objective, one aspect of the present disclosure provides an image object classification method, executed by a processor coupled to a memory, including: providing an image file including at least one image object; performing a process of extracting multiple binary-classified characteristics on the image object to obtain a plurality of first results independent of each other in categories; combining the plurality of first results in a manner of dimensionality reduction based on concatenation, and performing a process of characteristics abstraction on the combined first results to obtain a second result; and performing a process of characteristics integration on the plurality of first results and the second result in a manner of dot product of matrices to obtain a classification result.

In one embodiment of the present disclosure, the classification result includes the second result, the second result further includes classification reliabilities of the plurality of first results, wherein after the classification result is obtained, the method further includes documenting the classification result, which comprising: selecting at least one of the plurality of first results according to a result of sorting the classification reliabilities of the plurality of first results; and recording at least one category attribution name, at least one object position, and at least one object size corresponding to the at least one selected first result, in a file.

In one embodiment of the present disclosure, the object position includes a combination of a start-point coordinate and an end-point coordinate of the image object, or a combination of a center coordinate, an object length, and an object width of the image object.

In one embodiment of the present disclosure, after the classification result is obtained, the method further includes performing a graphic-text process on the classification result to present the classification result in the image file in the form of a graphic block, a text block, or a combination thereof.

In one embodiment of the present disclosure, the second result is obtained by performing the process of characteristics abstraction on the combined first results in a fully connected manner.

In one embodiment of the present disclosure, the second result is obtained by performing the process of characteristics abstraction on the combined first results through multi-layer perception.

In one embodiment of the present disclosure, the plurality of first results are sequentially concatenated into a combined dimensionality-reduced result.

In one embodiment of the present disclosure, the multiple binary-classified characteristics are extracted on the image object from a plurality of image categories that include a plurality of schematic diagrams of characteristics of an electronic component.

Another aspect of the present disclosure provides an image object classification system including a processor coupled to a memory storing at least one instruction configured to be executed by the processor to perform the above method.

Another aspect of the present disclosure provides a tangible, non-transitory, computer readable medium storing instructions that cause a computer to execute the above method.

The image object classification method, system, and tangible non-transitory computer readable medium of the present disclosure are provided for providing an image file including at least one image object; performing a process of extracting multiple binary-classified characteristics on the image object to obtain a plurality of first results independent of each other in categories; combining the plurality of first results in a manner of dimensionality reduction based on concatenation, and performing a process of characteristics abstraction on the combined first results to obtain a second result; and performing a process of characteristics integration on the plurality of first results and the second result in a manner of dot product of matrices to obtain a classification result. Thus, after the object is processed as mentioned above classification process, it is possible to output implicit information that the image object belongs to multiple categories, which is beneficial to digital documents containing multiple image categories.

DETAILED DESCRIPTION OF EMBODIMENTS

The following description of the various embodiments is provided to illustrate the specific embodiments of the present disclosure. Furthermore, directional terms mentioned in the present disclosure, such as upper, lower, top, bottom, front, rear, left, right, inner, outer, side, surrounding, central, horizontal, lateral, vertical, longitudinal, axial, radial, uppermost, and lowermost, which only refer to the direction of drawings. Therefore, the directional terms configured as above are for illustration and understanding of the present disclosure and are not intended to limit the present disclosure.

Figure 1:
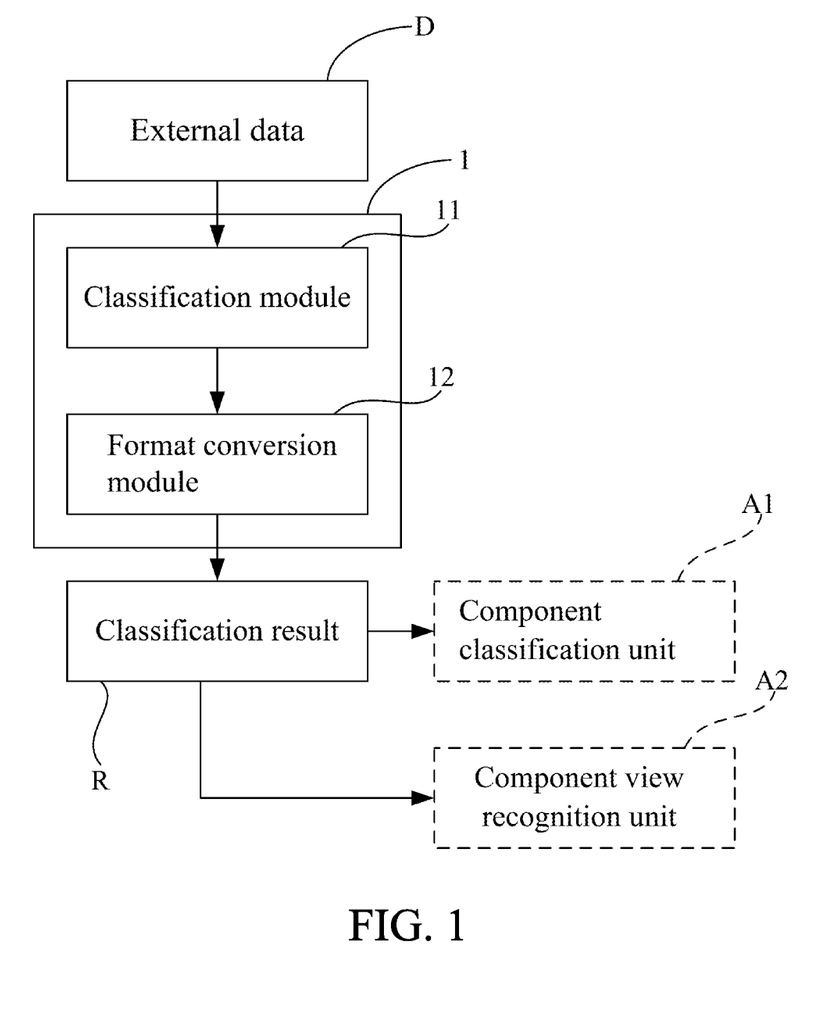
FIG. 1 is a schematic diagram of an image object classification system according to some embodiments of the present disclosure.

Please refer to FIG. 1. One aspect of the present disclosure provides an image object classification system, which can be configured to include a processing device 1 including a classification module 11 and a format conversion module 12 coupled to each other. The coupling manner can be coupling or connection methods, such as wired connection, wireless transmission, or data exchange. The classification module 11 and the format conversion module 12 can be software modules, hardware modules, or software and hardware cooperative operation modules. For example, the classification module 11 can be configured to have data input, processing, and output functions, such as data reading, calculation, and display, to generate a classification result R based on external data D. The format conversion module 12 can be configured to have a data format conversion function. Furthermore, the image object classification system can further include a database (not shown). The database can be coupled to the classification module 11 and the format conversion module 12 to store relevant data for processing, such as data sets or parameters for training machine learning modules. The image object classification system may further include other parts, such as a component classification unit A1 and a component view recognition unit A2. The component classification unit A1 is used for performing a component classification operation. The component view recognition unit A2 is used for a component view direction recognition operation according to the classification result R.

For example, the image object classification system may be configured to include a processor and a memory coupled to the processor, wherein the memory stores at least one instruction executed by the processor to perform an image object classification method provided by another aspect of the present disclosure, which is illustrated later, but not limited here.

Another aspect of the present disclosure that provides an image object classification method that is executed by a processor coupled to a memory and includes providing an image file, e.g., being converted from a document file, wherein the image file includes at least one image object; performing a process of extracting multiple binary-classified characteristics on the image object to obtain a plurality of first results independent of each other in categories; combining the plurality of first results in a manner of dimensionality reduction based on concatenation, and performing a process of characteristics abstraction on the combined first results to obtain a second result; and performing a process of characteristics integration on the plurality of first results and the second result in a manner of dot product of matrices to obtain a classification result. Embodiments that can be implemented are given later as examples to provide an understanding of relevant content, but not limited here.

Figure 2:
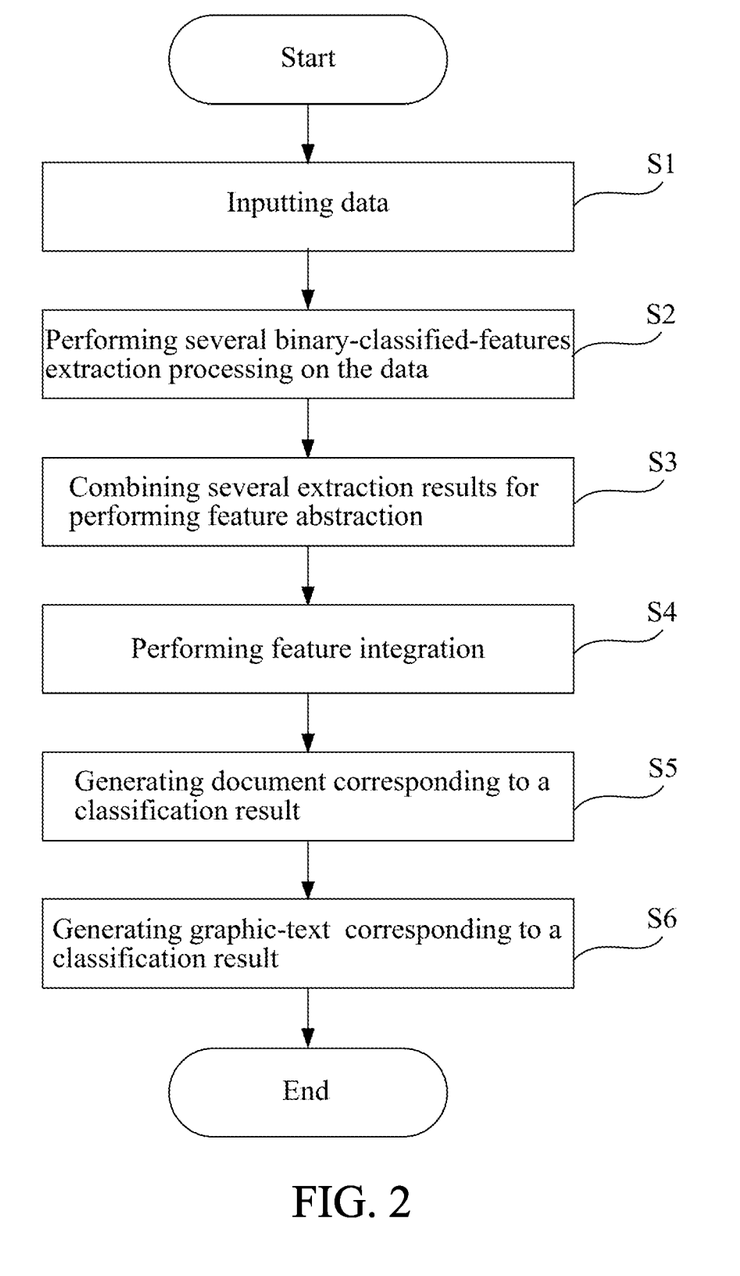
FIG. 2 is a flowchart of an image object classification method according to some embodiments of the present disclosure.

For example, as shown in FIG. 2, the image object classification method may include steps S1 to S6. At least one part of these steps may be appropriately changed, simplified, or omitted based on actual applications to complete at least one part of the above-mentioned embodiment.

In step S1, may be configured to input external data as a basis for subsequent image object classification. For example, the external data is read. The external data can be an image file. As an example, the image file can be provided after a document file is converted and stored by an external machine, but not limited here.

The external data can also be the document file, and the processor can convert the document file to provide the image file. The image file is at least provided in the manner mentioned above and is not restricted here. For example, the document file can be a digital document file containing various graphic examples (such as different electronic component views) and text examples (such as explanatory text). For example, "*.pdf," a portable document format, e.g., the file's content can include technical documents (datasheets) related to electronic components, but not limited here.

The digital document file can also be in other file formats, e.g., other file formats, including, but is not limited to, graphics and text, such as "*.doc" or "*.odt." Additionally, the external data can also include other data, such as tables. The image file can be in compressed or uncompressed file format, such as "*.jpg," but it is not limited here. The image file can also be in other file formats, such as "*.png" or "*.bmp."

The image files described later can refer to file data or screen content of them displayed on a display device, which can also be called as pictures. Subsequently, step S2 can be performed.

In step S2, may be configured to perform a process of extracting multiple binary-classified characteristics on at least one image object to obtain a plurality of first results independent of each other in categories. For example, the image file containing at least one image object is simultaneously sent into a plurality of modules with different binary classifier functions to obtain a plurality of first results.

The plurality of first results are independent of each other in states of classification. A setting manner to features (such as architecture and parameters) of the module can be understandable by a person having ordinary skill in the art, and will not be repeated here. Subsequently, a step S3 can be performed.

For example, image data in a data set can be input into a plurality of binary classification modules that have been trained for different features to perform operations to generate a plurality of output results as the plurality of first results. For example, the modules with binary classifier functions can perform feature extraction for different image object features. An application scenario of electronic components is taken as an example. Schematic diagrams of various features of electronic components can be classified, such as appearance features, electrical features, and application features.

For example, drawing views of electronic components may be adopted. Each of drawing-view diagrams (such as top-view, bottom-view, and side-view) has line segments and geometries for showing the components' size. In addition, pin-assignment diagrams (also called such as pin configurations, pinout diagrams, pin function diagrams etc., e.g., integrated circuit (IC) diagrams showing the feature of pins, hereinafter referred to as IC diagrams) of the electronic components may be adopted. Each of the pin-assignment diagrams of the IC package has geometries showing pins and text.

For example, a circuit diagram may be adopted (For example, the circuit formed by connecting symbols of electronic components has geometric graphs and lines). Also, characteristic curve diagrams may be adopted (For example, characteristic curve diagrams of the voltage or current of electronic components have waveform information formed by continuously extending lines).

For example, signal timing diagrams may be adopted (For example, each of the clock's timing diagrams, input, and output signals of electronic components has a closed block waveform composed of continuously extending lines used to present a continuous waveform relationship. The main difference between signal timing diagrams and the characteristic curve diagrams is there are more closed blocks and turning lines), but not limited here.

In addition, other image object classification scenarios, such as a mobile phone manual, may include a schematic diagram of appearance functions and a schematic diagram of screen functions. Graphic characteristics of the mobile phone manual can also be analyzed as a basis for classifying image objects.

In step S3, may be configured to combine the plurality of first results in a manner of dimensionality reduction based on a concatenation. The data of the plurality of first results are sequentially concatenated. The data arranged on the plane is reduced in dimensionality and converted into linearly arranged data. A process of characteristics abstraction can be performed on the combined first results to obtain a second result.

For example, the plurality of first results are processed in a combined dimensionality reduction process (such as converting two-dimensional data into one-dimensional data). For example, the plurality of first results are sequentially concatenated to form a combined dimensionality-reduced result. Then, the combined dimensionality-reduced result is processed in a feature abstraction process.

For example, the features (patterns) of the combined dimensionality-reduced result can be summarized as an essential representation with less information, and irrelevant details are ignored to reduce complexity. It becomes a model that a device can efficiently process with computing capabilities, such as a multi-layer perceptron machine (also known as a fully connected layer).

For example, a one by one (1×1) convolution can be used for dimensional conversion. A dilated convolution can be used to adjust a receptive field to increase or decrease the extracted feature amount to obtain the second result. For example, the second result includes the symbolic value of the plurality of first results, such as the classification reliabilities of the plurality of first results.

The value ranges of all categories are independent and between 0 and 1, Sigmoid[0:1]. The setting method is understandable by those skilled in the art and will not be repeated. Subsequently, a step S4 can be performed.

In step S4, may be configured to perform a feature integration process on the plurality of first results and the second result in a manner of dot product of matrices to obtain a classification result. For example, the second result is sent to a model with a feature classifier function, such as a neural network module with a fully connected layer. The fully connected layer used in the embodiment of the present disclosure and another one that uses one by one (1×1) convolution is different in the overall application scenario.

Figure 3:
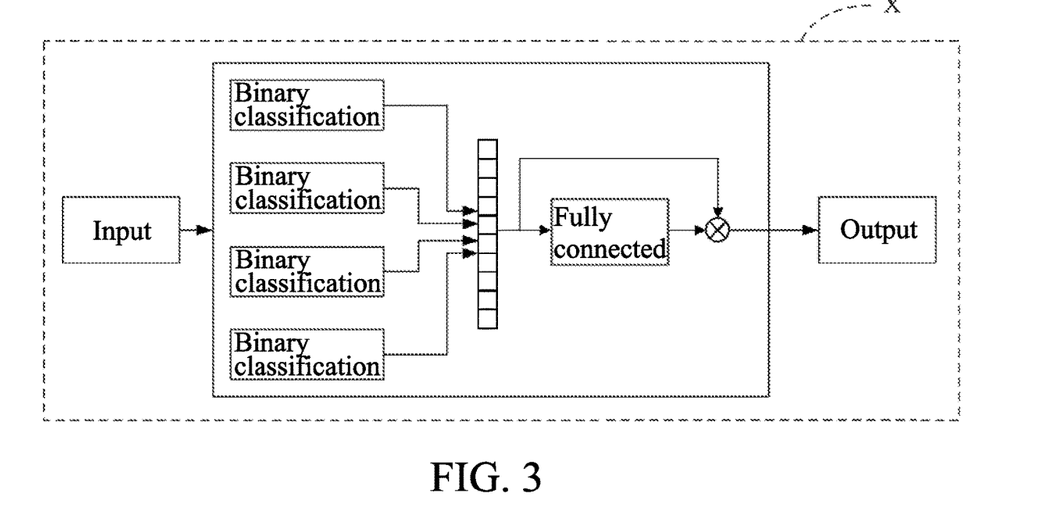
FIG. 3 is a schematic diagram of a multi-classifier used in some embodiments of the present disclosure.

For example, as shown in FIG. 3, in this example, the plurality of first results obtained by the binary classifier are simultaneously provided to the fully connected layer used here as the input data and provided to a feature integrator as operation source information. For example, the second result output by the fully connected layer and the plurality of first results will be processed in a combining operation, such as a superposition operation. For example, an operation of dot product of matrices can be adopted. For example, a product obtained by multiplying elements corresponding to positions in two matrices is regarded as an element of the other matrix at the same positions.

The operation result of the feature integrator includes a lot of original binary classification information and its derivatives extraction of classification information to combine different classification information as the classification result. The module features (such as architecture and parameters) are set in a manner that can be understandable by those skilled in the art and will not be repeated here. Subsequently, step S5 and/or step S6 can be performed.

Optionally, in step S5, the classification result includes the second result, and the second result further includes the classification reliabilities of the plurality of first results. Therefore, after the classification result is obtained, the classification result can be documented. At least one of the plurality of first results can be selected from a sorted result of the plurality of first results to record at least one category attribution name, at least one object position, and at least one object size. For example, when the classification result is obtained, the classification result includes information in the second result.

The second result contains the classification reliabilities corresponding to the plurality of first results. Therefore, the plurality of first results can be sorted according to the classification reliabilities. For example, the classification reliabilities of the plurality of first results can be normalized, such as using Max-Min normalization, L1 normalization, and L2 normalization, which are understandable by those skilled in the art and will not be repeated here. Subsequently, these normalized reliabilities can be sorted.

According to the sorted result, the corresponding category attribution name, object position, and object size of the plurality of first results are recorded. Subsequently, the category attribution name, object position, and object size corresponding to at least one of the plurality of first results can be selected according to preset conditions to create a document.

For example, one of the highest or top few reliabilities can be selected to save the data storage space and data transmission volume. For example, the position of the object includes any one combination of the following: a combination of a starting-point coordinate (such as the upper left corner coordinate) and an ending-point coordinate (such as the lower right corner coordinate) of the image object, or a combination of a center coordinate, a length, or a width of the image object, but not limited to here.

Optionally, in step S6, after the classification result is obtained, which may be further processed to generate graphs and texts. The classification result is presented in the image file as graphic blocks, word blocks, or a combination thereof. For example, the classification result may be presented in graphs (such as frames with different colors) and texts (such as black text with different background colors).

For example, a color block may be pasted at the top of the block, and a category of the classification result may be filled in a color block with words. When the graphic blocks belong to a plurality of categories, it is convenient to distinguish the categories with different colors to avoid confusion, but not limited here. For example, in another manner, the image file and the classification result can be separately stored in folders named with different category names. The same image file can appear in multiple folders at the same time, but not limited here.

Optionally, in one embodiment, the classification result includes the second result, the second result further includes classification reliabilities of the plurality of first results, wherein after the classification result is obtained, the method further includes: documenting the classification result, which including: selecting at least one of the plurality of first results according to a result of sorting the classification reliabilities of the plurality of first results; and recording at least one category attribution name, at least one object position, and at least one object size corresponding to the at least one selected first result, in a file. In this way, the classification result can be documented so that the classification result can be stored as field contents that are easy to understand to users, which helps related analyses.

Optionally, in one embodiment, the object position includes a combination of a start-point coordinate and an end-point coordinate of the image object, or a combination of a center coordinate, an object length, and an object width of the image object. In this way, an object position format can be set as parameters based on coordinates, facilitating subsequent image processing (such as posting graphs).

Optionally, in one embodiment, after the classification result is obtained, the image object classification method further includes: performing a graphic-text process on the classification result to present the classification result in the image file in the form of a graphic block, a text block, or a combination thereof. In this way, the classification result can be processed to generate graphs and texts. The classification result can be directly presented in the image file, which helps the user to intuitively know the classification result.

Optionally, in one embodiment, the second result is obtained by performing the process of characteristics abstraction on the combined first results in a fully connected manner.

Optionally, in one embodiment, the second result is obtained by performing the process of characteristics abstraction on the combined first results through multi-layer perception. In this way, the characteristics of the plurality of first results are abstractive by the multi-layer perception manner. It is beneficial to simplify the processing complexity of intermediate data.

Optionally, in one embodiment, the plurality of first results are sequentially concatenated into a combined dimensionality-reduced result. In this way, all information contained in the plurality of first results can be aggregated to ensure data richness.

In addition, the amount of calculation required for the combined dimensionality-reduced processing can also be simplified, which is beneficial to shorten the time acquiring the classification result.

Optionally, in one embodiment, the multiple binary-classified characteristics are extracted on the image object from a plurality of image categories that include a plurality of schematic diagrams of characteristics of an electronic component. For example, drawing views, IC diagrams, circuit diagrams, characteristic curve diagrams, and signal timing diagrams of the electronic component are discussed above, but not limited here. In this way, different image categories, such as drawing views, pin-assignment diagrams, circuit diagrams, characteristic curve diagrams, and signal timing diagrams of electronic components, can be effectively classified. It can help to accelerate data interpretation, analysis, and related development schedule.

In another aspect, the present disclosure further provides an image object classification system, which includes a processor coupled to a memory storing at least one instruction configured to be executed by the processor to perform the above-mentioned method. The coupling manner can be wired or wireless.

For example, the image object classification system can be configured as an electronic device with data processing functions. The electronic device can be cloud platform machines, servers, desktop computers, notebook computers, tablets, or smartphones, but not limited here.

The image object classification system, including a processor coupled to a memory storing at least one instruction configured to be executed by the processor to perform a method including: providing an image file including at least one image object; performing a process of extracting multiple binary-classified characteristics on the image object to obtain a plurality of first results that are independent of each other in categories; combining the plurality of first results in a manner of dimensionality reduction based on concatenation, and performing a process of characteristics abstraction on the combined first results to obtain a second result; and performing a process of characteristics integration on the plurality of first results and the second result in a manner of dot product of matrices to obtain a classification result. The implementation manner has been described above and will not be repeated.

In another aspect, the present disclosure further provides a tangible, non-transitory, computer readable medium, storing instructions that cause a computer to execute operations including: providing an image file including at least one image object; performing a process of extracting multiple binary-classified characteristics on the image object to obtain a plurality of first results that are independent of each other in categories; combining the plurality of first results in a manner of dimensionality reduction based on concatenation, and performing a process of characteristics abstraction on the combined first results to obtain a second result; and performing a process of characteristics integration on the plurality of first results and the second result in a manner of dot product of matrices to obtain a classification result.

After the instructions are loaded and executed by the computer, the computer can execute the aforementioned image object classification method. For example, several program instructions can be implemented by using existing programming languages to implement the aforementioned image object classification methods, such as using Python in combination with Numpy, Matplotlib, and TENSORFLOW packages, but not limited here.

In another aspect, the present disclosure further provides a computer-readable medium, such as an optical disc, a flash drive, or a hard disk, but is not limited here. It should be understandable that the computer-readable medium can further be configured as other forms of computer data storage medium, e.g., cloud storage (such as ONEDRIVE, GOOGLE Drive, AZURE Blob, or a combination thereof), or data server, or virtual machine. The computer can read the program instructions stored in the computer-readable medium. After the computer loads and executes the program instructions, the computer can complete the above-mentioned image object classification method.

To enable a person to understand the features of embodiments of the present disclosure, the following is an example of inputting a technical file (datasheet) of an electronic component as a document file and illustrates the classification process of the objects in the above embodiments. Still, it is not intended to be used as a limit.

It should be noted that the image object classification method, system, and tangible non-transitory computer readable medium of the above embodiments of the present disclosure mainly adopt the concepts of a multi-classifier X (as shown in FIG. 3). Binary multi-classification feature extraction processes are first processed on the input image object to obtain several first results that are independent of each other in category. For example, the plurality of first results can be combined in dimensionality reduction based on concatenation and performing a process of characteristics abstraction on the combined first results to obtain a second result. The plurality of first results and the second result are combined in dot-multiplication in matrices to obtain a classification result (such as the value ranges of all categories are independent and between 0 and 1, Sigmoid[0:1]).

Figure 4:
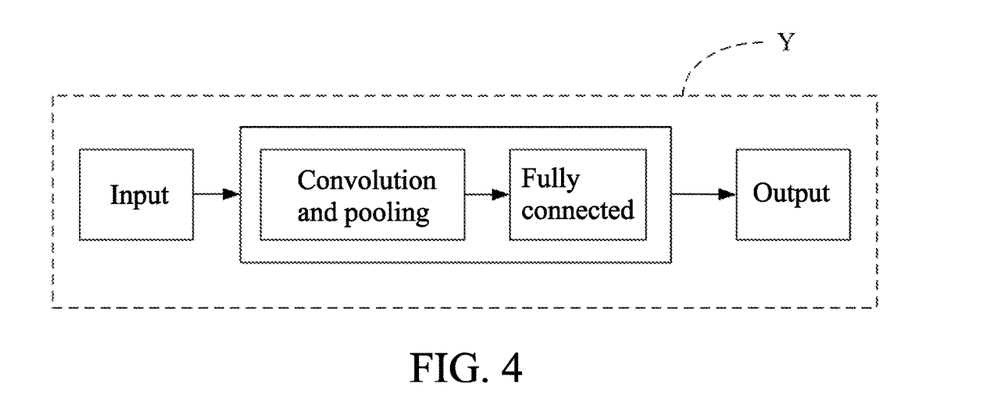
FIG. 4 is a schematic diagram of another non-multi-classifier not used in some embodiments of the present disclosure.

In comparison, while another non-multi-classifier Y (as shown in FIG. 4) can be used for image classification, it mostly uses a module based on a convolutional neural network (CNN), e.g., models, such as visual geometry group (VGG), deep residual network (ResNet), and real-time object detection (You only look once: Unified, Real-Time Object Detection, or Yolo, in short). The input image is convolved, pooled, and fully connected to obtain the output classification result (e.g., the sum of all categories is 1, Softmax[0:1]). However, after this model processes a classification, only a single classification result can be obtained, which is different from the present disclosure.

In comparison, the image object classification method of the above-mentioned embodiment of the present disclosure uses a plurality of binary classifiers. Each classifier classifies only two categories, e.g., when a request needs to be divided into five categories, ten categories can be used. The image object classification method of the above-mentioned embodiment of the present disclosure has advantages: through each binary classification result, it can be learned which of all categories are easy to distinguish and which of all categories are not easy to distinguish.

In addition, a full connection is subsequently added to perform feature integration training. For example, the classification results of several categories can be presented as multiple trust scores to be output (five categories or higher or lower), rather than just a single classification result.

In comparison, if the binary classifiers are used for non-multi-classification tasks, then the binary classifiers' results should be processed by a different decision-making mechanism. This decision-making mechanism usually requires different thresholds to determine a final result, resulting in more non-objective human intervention.

Conversely, the image object classification method of the above-mentioned embodiment of the present disclosure can use a fully connected layer instead of the decision-making mechanism. All decision thresholds can be objectively obtained by learning, which can effectively avoid effects of adjustments to the thresholds as a result of artificial intervention.

TABLE 1

Input Data Table

| Label name | quantity |
|---|---|
| characteristic curve | 1404 |
| circuit diagram | 825 |
| pin-assignment diagram | 514 |
| clock timing diagram | 1011 |
| drawing-view diagram | 1024 |
| total | 4778 |

For example, the image object classification method using the multi-classifier in the above-mentioned embodiment of the present disclosure will be compared with another method that uses the non-multi-classifier. For example, the non-multi-classifier uses one input terminal, one convolutional neural network (CNN) module, and one output terminal. The above-mentioned embodiment of the present disclosure uses one input terminal, ten binary classifiers, one fully connected network, and one output terminal. They are used for testing input data (such as characteristic curve diagrams, circuit diagrams, pin-assignment diagrams, clock timing diagrams, and three-view diagrams), as shown in Table 1 above. The test results (such as module name, sub-module, threshold, accuracy, and early-stop conditions) can be shown in Table 2 below.

TABLE 2

List of Test Results

| Model Name | Sub-model | Threshould | Accuracy | Early-stop Conditions Range | Epoch |
|---|---|---|---|---|---|
| The present disclosure (Multi-classification) | characteristic curve-to-circuit diagram | 0.5 | 87.53% | <0.01 | 5 |
| | characteristic curve-to-IC diagram | 0.5 | 94.84% | <0.01 | 5 |
| | characteristic curve-to-clock timing diagram | 0.5 | 90.02% | <0.005 | 5 |
| | characteristic curve-to-drawing-view diagram | 0.5 | 87.36% | <0.005 | 5 |

TABLE 2-continued

List of Test Results

| Model Name | Sub-model | Threshold | Accuracy | Early-stop Conditions Range | Early-stop Conditions Epoch |
|---|---|---|---|---|---|
| | circuit diagram-to-IC diagram | 0.5 | 97.46% | <0.01 | 5 |
| | circuit diagram-to-clock timing diagram | 0.5 | 91.37% | <0.01 | 5 |
| | circuit diagram-to-drawing-view diagram | 0.5 | 86.10% | <0.02 | 5 |
| | IC diagram-to-clock timing diagram | 0.5 | 99.80% | <0.001 | 5 |
| | IC diagram-to-drawing-view diagram | 0.5 | 89.99% | <0.01 | 5 |
| | clock timing diagram-to-drawing-view diagram | 0.5 | 90.66% | <0.005 | 5 |
| | binary-class-to-multi-class | 0.5 | 82.60% | no specific stop conditions | 5 |
| Non-multi-classification | CNN | 0.5 | 79.52% | <0.005 | 5 |

It can be seen from Table 2, the classification performance of the image object classification method, system, and tangible non-transitory computer readable medium of the present disclosure adopting the aforementioned multi-classification are significantly better than the classification performance of non-multi-classification.

The following examples illustrate the applications of embodiments of the present disclosure mentioned above as application examples for understanding the present disclosure's advantages, but is not limited here.

Figure 5A:
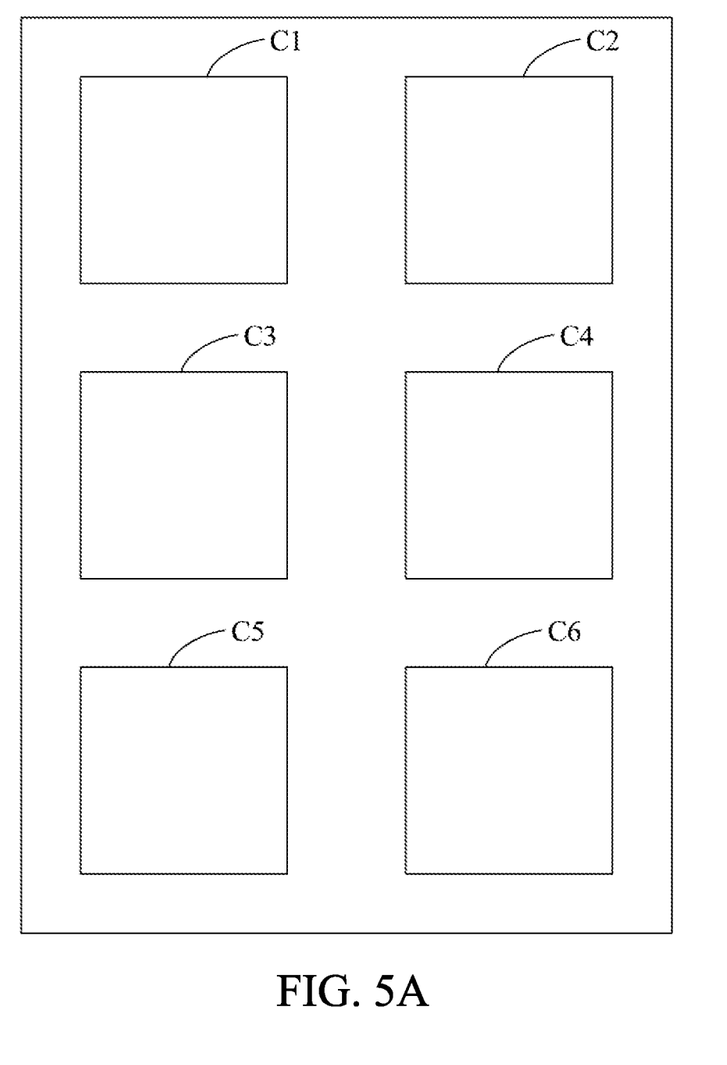
FIG. 5A is a schematic diagram of a first image example used to classify a single image object in some embodiments of the present disclosure.

For example, as shown in FIG. 5A, which is an example of classifying a single image object. An image file contains areas of characteristic curve diagrams C1, C2, C3, C4, C5, and C6 for classifying image objects. In this example, many characteristic curve diagrams can be effectively classified.

Figure 5B:
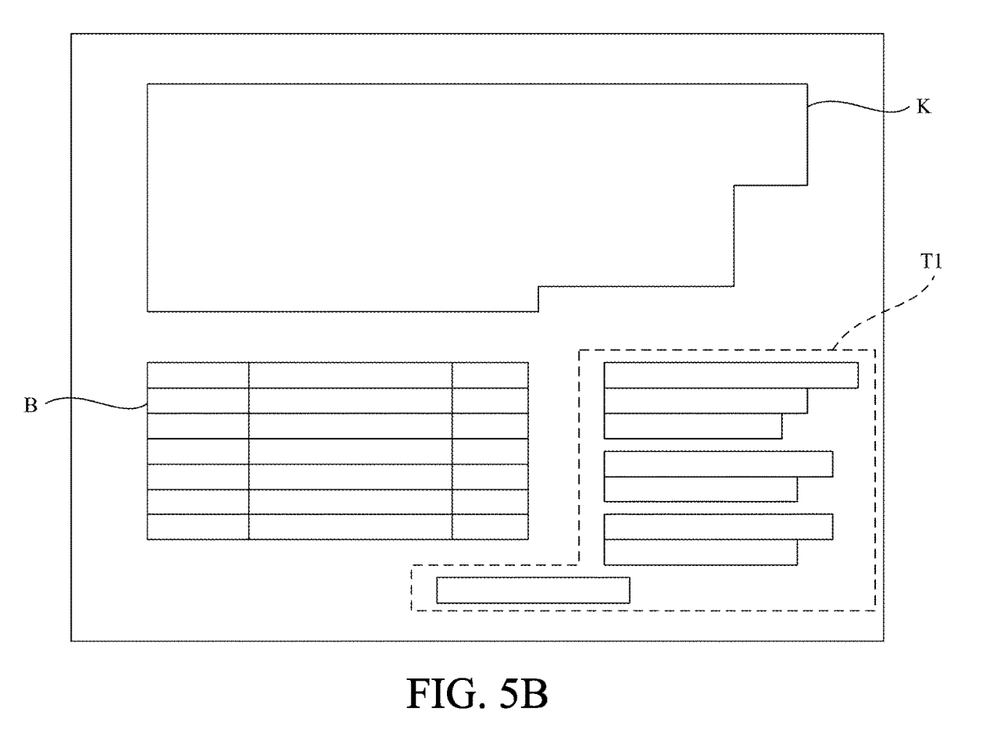
FIG. 5B is a schematic diagram of a second image example used to classify a single image object in some embodiments of the present disclosure.

Further, as shown in FIG. 5B, which is another example of classifying a single image object. An image file contains an area of circuit diagram K, an area of table B, and an area of text T1 for classifying image objects. In this example, the circuit diagram can be effectively classified.

Figure 5C:
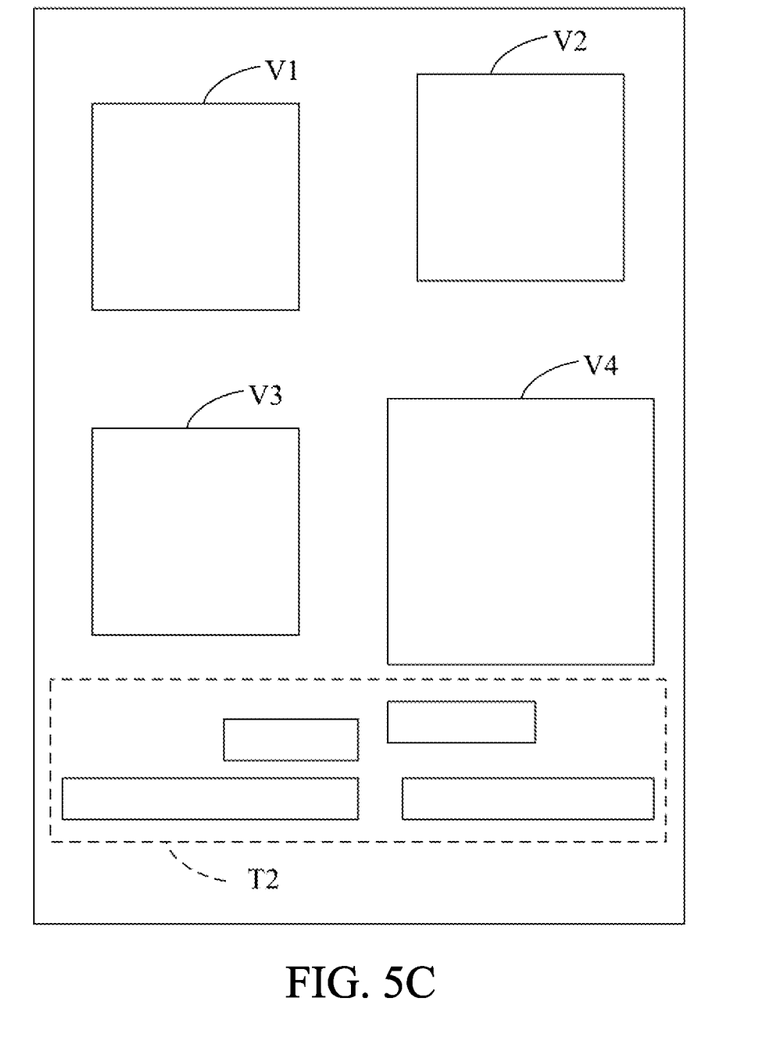
FIG. 5C is a schematic diagram of a third image example used to classify a single image object in some embodiments of the present disclosure.

Further, as shown in FIG. 5C, which is another example of classifying a single image object. An image file contains areas of IC diagrams V1, V2, V3, V4, and a text T2 for classifying image objects. In this example, the IC diagrams can be effectively classified.

Figure 5D:
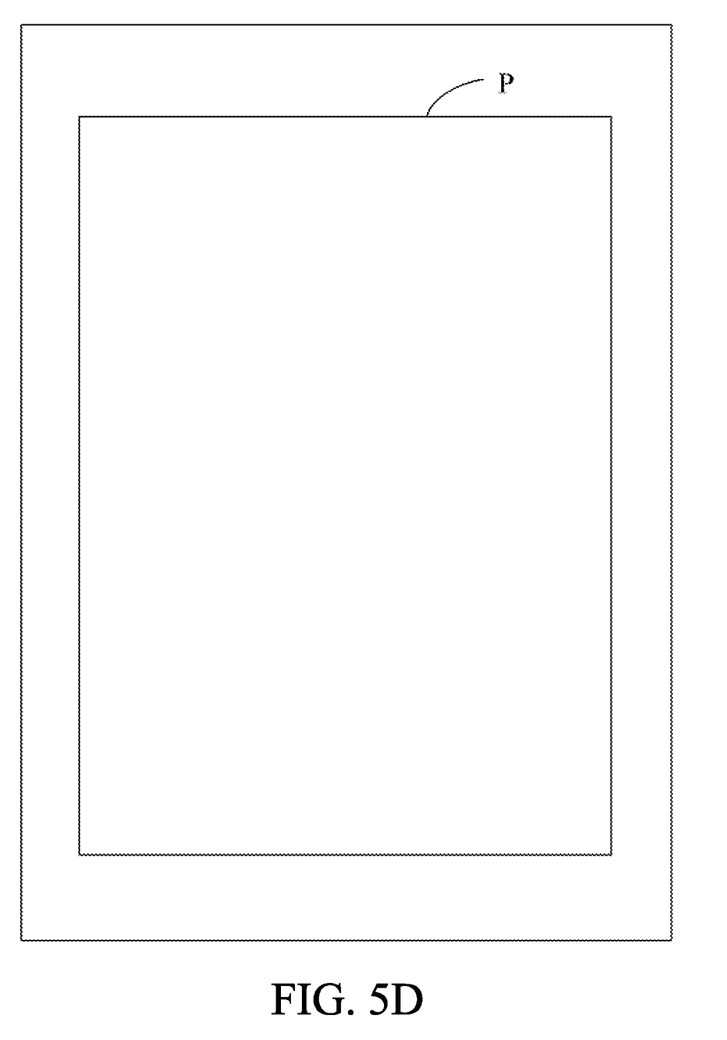
FIG. 5D is a schematic diagram of a fourth image example used to classify a single image object in some embodiments of the present disclosure.

Further, as shown in FIG. 5D, which is another example of classifying a single image object. An image file contains an area of signal timing diagram P for classifying image objects. In this example, the signal timing diagram can effectively be classified.

Figure 5E:
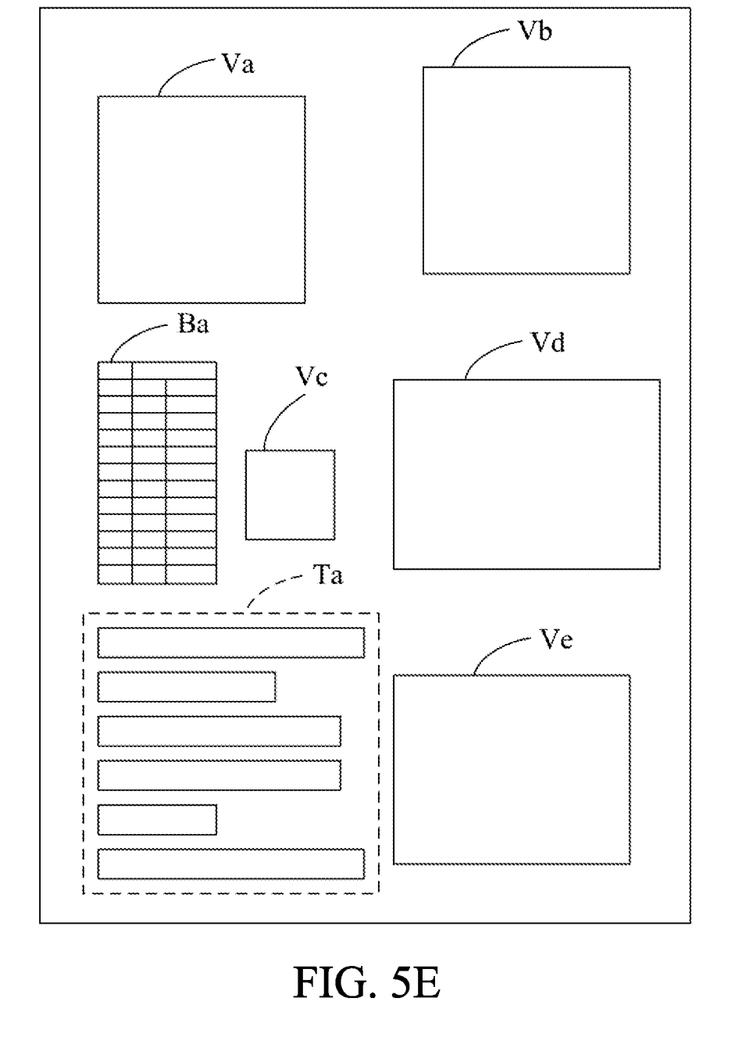
FIG. 5E is a schematic diagram of a fifth image example used to classify a single image object in some embodiments of the present disclosure.

Further, as shown in FIG. 5E, which is another example of classifying a single image object. An image file contains many areas of drawing views of electronic components Va, Vb, Vc, Vd, Ve, an area of table Ba, and an area of text Ta for classifying image objects. In this example, the drawing views of electronic components can be effectively classified.

Therefore, the image object classification method, system, tangible non-transitory computer readable medium, and computer-readable medium of the present disclosure can indeed classify a single type of image objects distributed in a digital document file.

Figure 6A:
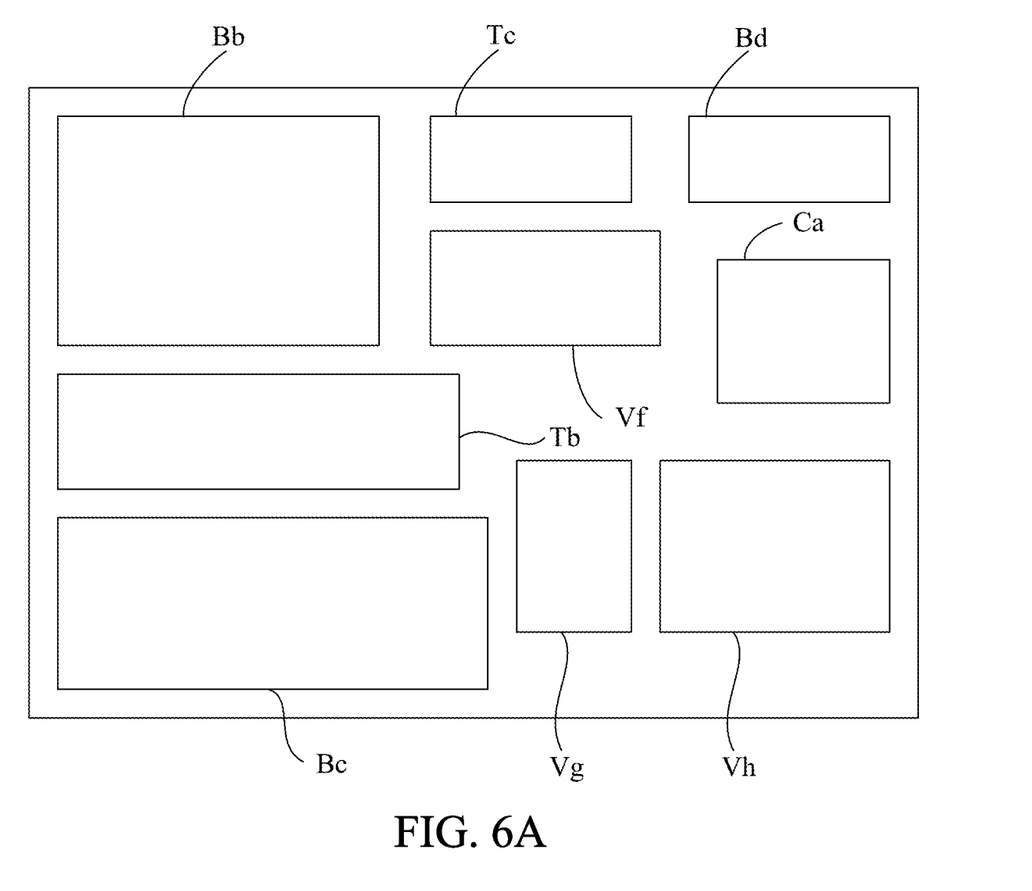
FIG. 6A is a schematic diagram of a first image example used to classify multiple image objects in some embodiments of the present disclosure.

In addition, as shown in FIG. 6A, which is an example of classifying multiple image objects. An image file contains areas of drawing views of electronic components Vf, Vg, Vh, and a characteristic curve diagram Ca, combining with tables Bb, Bc, Bd, and text Tb, Tc, for classifying image objects. In this example, the categories of both the drawing views and the characteristic curve diagrams can be effectively classified. For example, the classification order can be configured to find the drawing views and then find the characteristic curve diagrams, but not limited here.

Figure 6B:
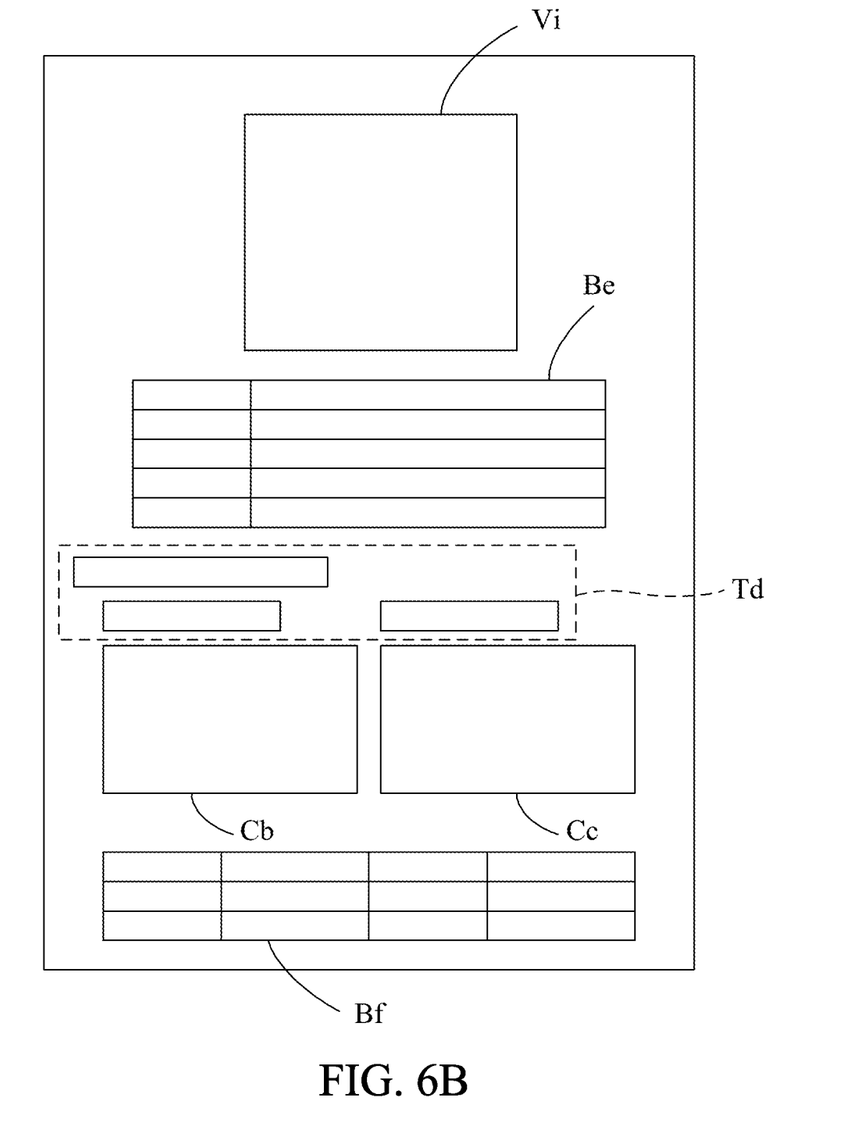
FIG. 6B is a schematic diagram of a second image example used to classify multiple image objects in some embodiments of the present disclosure.

Further, as shown in FIG. 6B, which is an example of classifying multiple image objects. An image file contains an area of IC diagrams Vi and areas of characteristic curve diagrams Cb and Cc combining with tables Be and Bf and an area of text Td for classifying image objects. In this example, the categories of both the IC diagrams and the characteristic curve diagrams can be effectively classified. For example, the classification order can be configured as first find the IC diagrams, and then find the characteristic curve diagrams, but not limited here. Therefore, the image object classification method, system, and tangible non-transitory computer readable medium of the present disclosure can indeed classify multiple image objects distributed in a digital document file.

Therefore, the image object classification method, system, and tangible non-transitory computer readable medium of the present disclosure perform the process of extracting multiple binary-classified characteristics, characteristics abstraction, and characteristics integration on the input image objects. They can process multiple relationships between object and category, such as one-to-one, multiple-to-one, one-to-multiple, and multiple-to-multiple classification scenarios. Thus, they can effectively output multiple classification outcomes as multiple trust scores, rather than just a single classification outcome.

In summary, the image object classification method, system, and tangible non-transitory computer readable medium of the present disclosure are provided for providing an image file including at least one image object; performing a process of extracting multiple binary-classified characteristics on the image object to obtain a plurality of first results independent of each other in categories; combining the plurality of first results in a manner of dimensionality reduction based on concatenation, and performing a process of characteristics abstraction on the combined first results to obtain a second result; and performing a process of characteristics integration on the plurality of first results and the second result in a manner of dot product of matrices to obtain a classification result. Thus, through the aforementioned object classification process, it is possible to output implicit information that the image object belongs to multiple categories, which is beneficial to digital documents containing multiple image categories.

Although the present disclosure has been disclosed in preferred embodiments, which are not intended to limit the disclosure, those skilled in the art can make various changes and modifications without departing from the spirit and scope of the disclosure. Therefore, the scope of protection of the present disclosure is defined as definitions of the scope of the claims.

What is claimed is:

1. An image object classification method, executed by a processor coupled to a memory, comprising:
providing an image file including at least one image object;
performing a process of extracting multiple binary-classified characteristics on the image object to obtain a plurality of first results independent of each other in categories;
combining the plurality of first results in a manner of dimensionality reduction based on concatenation, and performing a process of characteristics abstraction on the combined first results to obtain a second result; and
performing a process of characteristics integration on the plurality of first results and the second result in a manner of dot product of matrices to obtain a classification result.

2. The image object classification method as claimed in claim 1, wherein the classification result comprises the second result, the second result further includes classification reliabilities of the plurality of first results, wherein after the classification result is obtained, the method further comprises:
documenting the classification result, comprising:
selecting at least one of the plurality of first results according to a result of sorting the classification reliabilities of the plurality of first results; and
recording at least one category attribution name, at least one object position, and at least one object size corresponding to the at least one selected first result, in a file.

3. The image object classification method as claimed in claim 2, wherein the object position includes a combination of a start-point coordinate and an end-point coordinate of the image object, or a combination of a center coordinate, an object length, and an object width of the image object.

4. The image object classification method as claimed in claim 1, wherein after the classification result is obtained, the method further comprises:
performing a graphic-text process on the classification result to present the classification result in the image file in the form of a graphic block, a text block, or a combination thereof.

5. The image object classification method as claimed in claim 1, wherein the second result is obtained by performing the process of characteristics abstraction on the combined first results in a fully connected manner.

6. The image object classification method as claimed in claim 1, wherein the second result is obtained by performing the process of characteristics abstraction on the combined first results through multi-layer perception.

7. The image object classification method as claimed in claim 1, wherein the plurality of first results are sequentially concatenated into a combined dimensionality-reduced result.

8. The image object classification method as claimed in claim 1, wherein the multiple binary-classified characteristics are extracted on the image object from a plurality of image categories that include a plurality of schematic diagrams of characteristics of an electronic component.

9. An image object classification system, comprising a processor coupled to a memory storing at least one instruction configured to be executed by the processor to perform a method comprising:
providing an image file including at least one image object;
performing a process of extracting multiple binary-classified characteristics on the image object to obtain a plurality of first results independent of each other in categories;
combining the plurality of first results in a manner of dimensionality reduction based on concatenation, and performing a process of characteristics abstraction on the combined first results to obtain a second result; and
performing a process of characteristics integration on the plurality of first results and the second result in a manner of dot product of matrices to obtain a classification result.

10. A tangible, non-transitory, computer readable medium, storing instructions that cause a computer to execute operations comprising:
providing an image file including at least one image object;
performing a process of extracting multiple binary-classified characteristics on the image object to obtain a plurality of first results independent of each other in categories;
combining the plurality of first results in a manner of dimensionality reduction based on concatenation, and performing a process of characteristics abstraction on the combined first results to obtain a second result; and
performing a process of characteristics integration on the plurality of first results and the second result in a manner of dot product of matrices to obtain a classification result.

* * * * *